United States Patent
Welker et al.

(10) Patent No.: US 7,756,789 B2
(45) Date of Patent: Jul. 13, 2010

(54) METHOD AND SYSTEM FOR DEBT RECOVERY

(75) Inventors: Daniel J Welker, Boise, ID (US); Anthony P. Reynolds, Richmond, VA (US); John F. Magnuson, Boise, ID (US); James A. Haworth, Boise, ID (US); Sow A. Kobayashi, Boise, ID (US); Oren Knishinsky, Boston, MA (US)

(73) Assignee: Capital One Financial Corporation, McLean, VA (US)

( * ) Notice: Subject to any disclaimer, the term of this patent is extended or adjusted under 35 U.S.C. 154(b) by 1556 days.

(21) Appl. No.: 10/935,696

(22) Filed: Sep. 7, 2004

(65) Prior Publication Data
US 2006/0080236 A1  Apr. 13, 2006

Related U.S. Application Data

(60) Provisional application No. 60/608,943, filed on Sep. 11, 2003.

(51) Int. Cl.
*G06Q 40/00* (2006.01)
(52) U.S. Cl. .......................................... 705/41; 705/39
(58) Field of Classification Search .................. 705/40
See application file for complete search history.

(56) References Cited

U.S. PATENT DOCUMENTS

| | | | |
|---|---|---|---|
| 6,222,914 B1 * | 4/2001 | McMullin | 379/144.01 |
| 7,440,922 B1 * | 10/2008 | Kempkes et al. | 705/39 |
| 7,559,217 B2 * | 7/2009 | Bass | 70/40 |
| 2002/0123946 A1 | 9/2002 | Haworth et al. | 705/35 |
| 2002/0123962 A1 * | 9/2002 | Bryman et al. | 705/39 |
| 2002/0138409 A1 * | 9/2002 | Bass | 705/38 |
| 2002/0152116 A1 | 10/2002 | Yan et al. | 705/14 |
| 2003/0105689 A1 * | 6/2003 | Chandak et al. | 705/35 |
| 2004/0002916 A1 * | 1/2004 | Timmerman et al. | 705/39 |
| 2004/0118914 A1 * | 6/2004 | Smith et al. | 235/380 |
| 2005/0102228 A1 * | 5/2005 | Srinivasan et al. | 705/39 |
| 2005/0259799 A1 * | 11/2005 | Charytan et al. | 379/114.15 |
| 2006/0259362 A1 * | 11/2006 | Cates | 705/14 |
| 2008/0114676 A1 * | 5/2008 | Burton et al. | 705/40 |

FOREIGN PATENT DOCUMENTS

JP    2003263568 A  *  9/2003

* cited by examiner

*Primary Examiner*—Hani Kazimi
*Assistant Examiner*—William E Rankins
(74) *Attorney, Agent, or Firm*—Hunton & Williams, LLP

(57) ABSTRACT

According to one embodiment of the invention, a method of debt recovery is provided. The method includes providing a device to a consumer owing a debt to a creditor. The device has a utility that becomes available to the consumer after being activated by the creditor. The method also includes indicating to the consumer that the utility of the device will be activated if the consumer contacts the creditor.

37 Claims, 4 Drawing Sheets

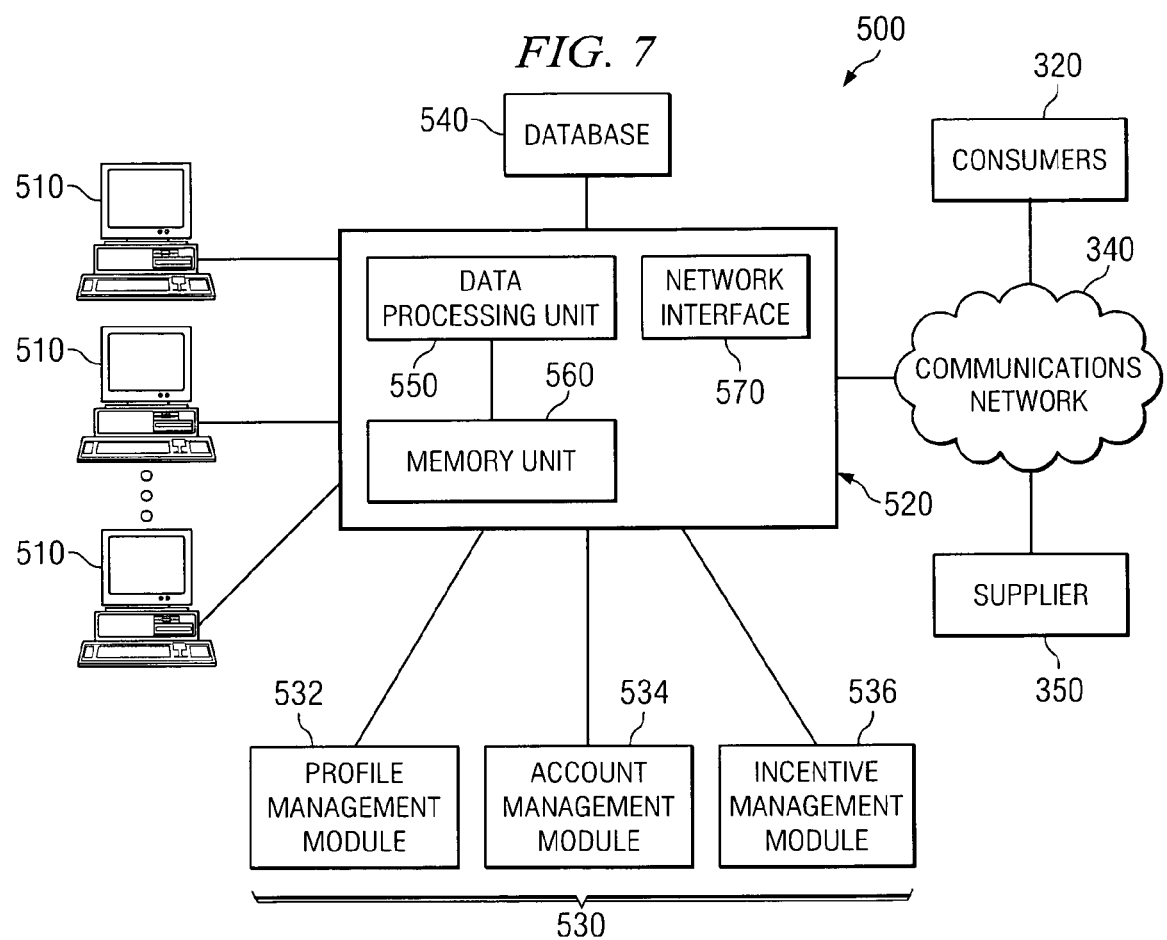

METHOD AND SYSTEM FOR DEBT RECOVERY

RELATED APPLICATIONS

This application claims the benefit under 35 U.S.C. §§119 (e), 111(b)(6), and 37 C.F.R. §1.53(c)(2) of the filing date of a converted-to U.S. Provisional Application Ser. No 60/608, 943 having an effective filing date of Sep. 11, 2003 and entitled Method and System for a Stored-Value Card, which, on Jul. 12, 2004, was converted to a provisional application from a non-provisional U.S. patent application Ser. No. 10/660,171, filed Sep. 11, 2003, and entitled Method and System for a Stored-Value Card.

TECHNICAL FIELD OF THE INVENTION

This invention relates generally to financial transactions and more particularly to a method and system for debt recovery.

BACKGROUND OF THE INVENTION

A service provider, such as a bank or other financial institution, a car dealership, a furniture company, or any entity providing goods, services, or funds to a consumer generally provides credit accounts to consumers. A credit account may also be generated by a "point of sale" transaction whereby a consumer tenders a negotiable instrument, such as a check, that is insufficient to cover the required amount of the transaction. These service providers allow the consumers to make purchases on credit rather than using cash. Consumers incur debt with each credit purchase which may be repaid over time according to the terms and conditions of the particular customer's credit account. Credit accounts may include a credit card account that provides a customer with one or more lines of credit, typically including at least one revolving credit line in which the customer may choose either to pay the full amount of debt owed on his account by a specified date or defer payment of at least a portion of the debt to a later date. Credit accounts may also include a loan for a specific purchase, such as an installment loan, or a line of credit from a retailer. The service provider typically charges the customer interest or finance charges for deferred payments during the period of deferral.

The service provider typically establishes a credit limit for each credit account defining the maximum amount of credit available to the customer for making purchases at any given time. When a customer makes a credit card purchase, the amount of credit available to the customer, often called the available balance, is reduced by the amount of the purchase, and the amount of debt currently owed by the customer, often called the outstanding balance, is increased by the amount of the purchase.

Occasionally, a consumer defaults on a credit card, revolving credit account, or installment loan by failing to pay the balance required by the credit agreement between the consumer and the service provider. After a period of time with no payment from the consumer, the service provider is required to write off the balance owed by the consumer as a loss. Write-offs by service providers are commonly called "charged-off" debts in the credit industry. Banks, credit card issuers, and other financial institutions often have difficulty in recovering charged-off debt. Two of the main problems associated with recovering charged-off debt involve establishing communication with a consumer/debtor, and providing a consumer/debtor with an attractive reason to pay the debt. Often, banks, financial institutions, collection agencies, and debt consolidation companies ("service providers") attempt to establish communication with a consumer through direct-mail offers or telephone solicitation. Attempts to contact consumers in this manner are often unsuccessful, due primarily to the fact that consumers merely see this offer of debt consolidation, or debt repayment, as an additional line of credit often associated with an additional credit card. Therefore, consumers rarely respond to direct mail for offers of credit or debt repayment.

Additionally, consumers are often aware that their debt has been charged off, and though such charge-offs result in damage to the consumer's credit rating and/or credit report, offers to pay off the charged-off debt generally fail to provide attractive incentives for consumers to agree to repayment terms for their otherwise charged-off debt.

SUMMARY OF THE INVENTION

In accordance with the present invention, a system and method are provided that substantially increase the ability of a service provider to recover charged-off debt from a consumer or establish a credit account with a consumer. Additionally, the disadvantages and problems associated with previous methods of recovering charged-off debt are substantially reduced or eliminated.

According to one embodiment of the invention, a method of debt recovery is provided. The method includes providing a device to a consumer owing a debt to a creditor. The device has a utility that becomes available to the consumer after being activated by the creditor. The method also includes indicating to the consumer that the utility of the device will be activated if the consumer contacts the creditor.

According to one embodiment, a stored-value card is made available to a consumer. The stored-value card may have an activation protocol that allows the consumer to have the card activated. Once the card is activated, a debt repayment plan may be provided to the consumer. In another embodiment, a gift card with an activation protocol is made available to a consumer. The consumer may activate the gift card by following the activation protocol. Upon contact by the consumer, a debt recovery plan may be offered to the consumer.

In yet another embodiment, a stored-value card system is provided wherein a profile management module evaluates a consumer's credit account to determine the consumer's debt recovery risk and makes a stored-value card available to the consumer. An incentive management module preferably generates a debt recovery plan having at least one debt recovery incentive corresponding to the account, and an account management module may apply the debt recovery incentive to the account upon receiving at least one payment from the consumer.

Some of the embodiments of the invention provide numerous advantages. For example, to activate the card, the consumer must establish communication with the service provider. Additionally, if a consumer agrees to a repayment plan for the consumer's debt, the service provider has the option of, in one embodiment, sending new gift cards with stored value or, in another embodiment, re-loading the original debit card mailed to the consumer with additional dollar value. Embodiments of the present invention may provide some, none, or all of these advantages. Other advantages may be readily ascertained by one of ordinary skill in the art.

BRIEF DESCRIPTION OF THE DRAWINGS

Reference is now made of the following description taken in conjunction with the accompanying drawings, wherein like reference numbers represent like parts, in which:

FIG. 7 illustrates an example debt recovery system in accordance with an embodiment of the present invention.

DETAILED DESCRIPTION OF THE DRAWINGS

Embodiments of the invention are best understood by referring to FIGS. 1-7 of the drawings, like numerals being used with like and corresponding parts of the various drawings. In general, certain embodiments of the present invention are directed to combining a method of soliciting consumer contact with a service provider for the purpose of establishing a repayment plan for the collection of the consumer's outstanding debt. Preferably, the repayment plan includes an incentive program that rewards the consumer for repaying the outstanding debt. In the following description, the term "service provider" is used to denote a credit card company, bank, lender, or any other credit provider, including merchants, car dealers, retailers and the like, who may enter a creditor-debtor relationship with a consumer by engaging, for example, in a "point of sale" transaction. The term "consumer" is used to denote any individual or entity with an outstanding credit balance which is subject to collection or charge-off.

In general, other than differences in interest rates offered by service providers, consumers have few criteria for choosing service providers for their credit needs. Additionally, consumers having charged-off debt have little or no incentive to repay that debt. For example, the consumer's credit rating is already damaged by the fact that the consumer owes charged-off debt, and any repayment that the consumer may attempt would normally be on a dollar-for-dollar basis. Additionally, most solicitation offers are generated in the form of direct mailing to consumers that have been targeted due to the existence of their charged-off debt, credit rating, or recent credit history. Consumers generally see these offers as the offer for an additional credit card or additional loan, and thus are less likely to respond because of the trouble they may have had in the past with credit cards, or simply that the consumer has no apparent need for an additional credit card. Also, most consumers with charged-off debt are higher risk consumers that have little or no incentive to contact a credit card company to rectify their charged-off debt situation. Accordingly, various embodiments of the present invention provide incentives for a consumer to establish contact with the service provider, as well as repay any charged-off debt.

Figures 1, 2:
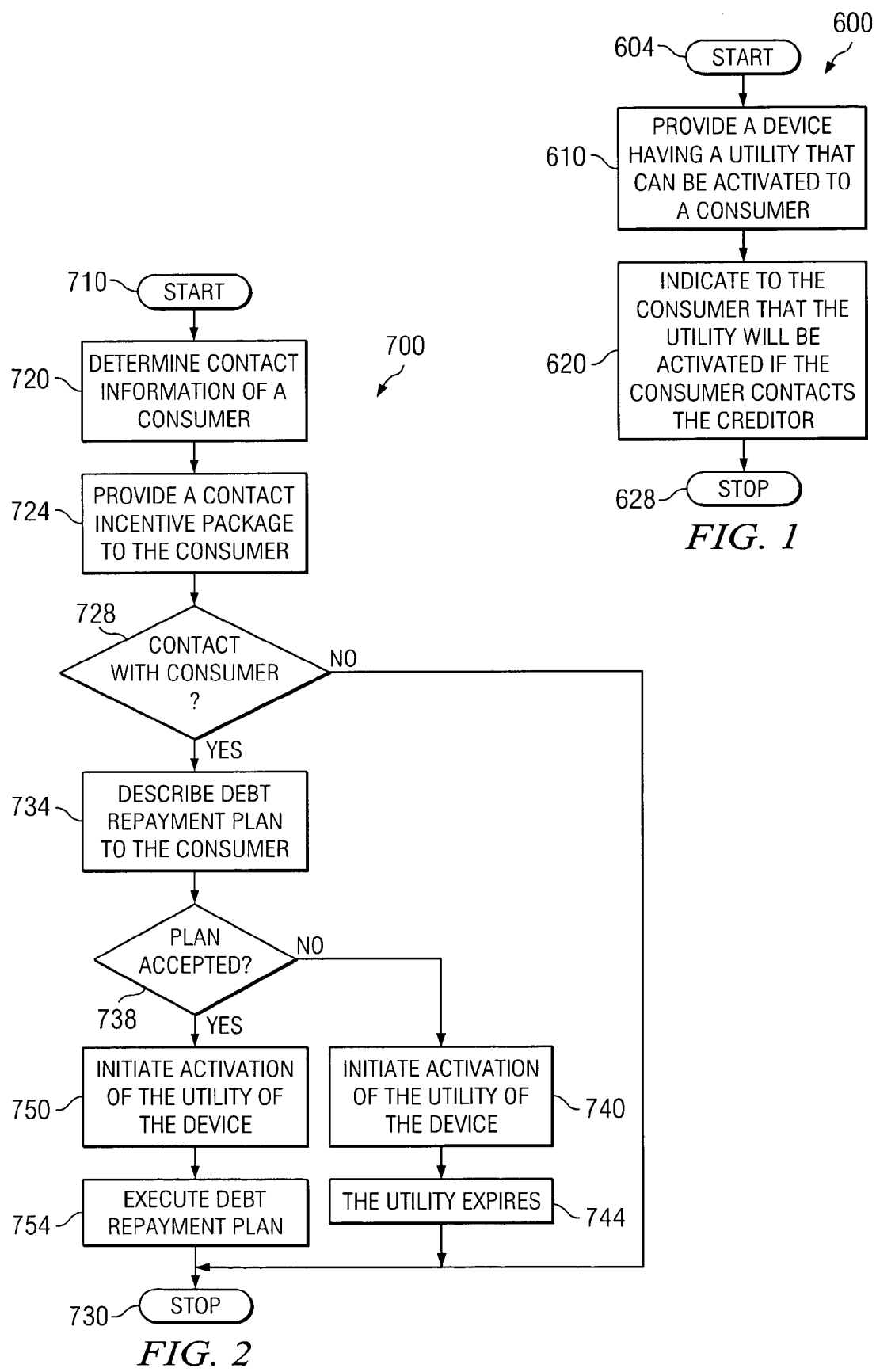
FIG. 1 illustrates a method for recovering debt from a consumer in accordance with an embodiment of the present invention.
FIG. 2 illustrates a method for recovering debt from a consumer in accordance with an embodiment of the present invention.

FIG. 1 is a flowchart illustrating one embodiment of a method 600 for providing a contact incentive package. Method 600 starts at step 604. At step 610, a consumer is provided with a device that has a utility. The utility becomes available to the consumer upon activation. The device may be provided by a creditor. However, any party who wants to establish contact with the consumer may provide the device or cause the device to be provided. The activation of the utility may be initiated by the provider of the device, which may be a service provider, or any party who wants to establish contact with the consumer. For example, a third party, on behalf of a service provider, may provide the device or perform any of the other steps or functions discussed below in the various embodiments. In some embodiments, a creditor to whom the consumer owes a debt, such as money, may provide the device of step 610.

The utility or function of the device varies depending on the nature of the device. For example, where the device is a pre-loaded debit card, the utility of the pre-loaded debit card resides in the monetary value that is credited to the account associated with the debit card. Where the device is a calling card, the utility of the calling card resides in the balance of the calling minutes associated with the calling card or the account of the calling card. More than one function or utility may be associated with a device. For example, where the device is a mobile phone, a plurality of functions such as calling, voice mail, text-messaging, and scheduling may be the utilities of the device.

The device of step 610 may be any device that can be configured so that one or more utilities or functions associated with the device becomes available to the consumer after a third party initiates an activation of the utilities and/or function. Examples of such a device include, but are not limited to, a stored-value card (SVC), a phone card, a gift card, a pre-loaded debit card, a credit card, a gas card, a mobile phone, a mobile email device, computer software, computer hardware, a travel pass, and an event pass. The utilities associated with the device may be withheld from a consumer and activated later by another party in various ways depending on the particular features of the device. For example, a creditor may provide an SVC without allowing the consumer who receives the SVC to benefit from the value stored in the SVC by placing the account associated with the SVC in an "inactive" status. Later, the creditor may activate the SVC by changing the status of the account from "inactive" to "active," which allows the consumer to make purchases using the amount of value "stored" in the account. In some embodiments, the device itself may be configured so that the functions of the device will be locked until authentication data is entered into the device. For example, a mobile phone, such as a pre-paid cellular phone, may be programmed so that at least one of the functions, such as the calling function, is not available to the consumer who receives the mobile phone. The provider of the device (or a third party) may initiate an activation of the mobile phone by providing the consumer with an activation code, which then may be entered into the key pad of the mobile phone to unlock a part or all of the functions associated with the mobile phone. In some embodiments, the device may be configured, or an account associated with the device may be established, to allow the consumer to benefit from some of the functions of the device, but not all of the functions of the device. For example, where the device is a mobile phone, the mobile phone may be configured so that the consumer can use the mobile phone to call only a limited number of parties, such as the creditor or third party who provided the mobile phone and/or emergency services such as 911, police, fire fighters, and paramedics. One skilled in the art may determine other suitable ways to withhold the functions of a device from a consumer so that a party, such as a creditor, may provide the device to the consumer without allowing the consumer to benefit from at least some of the functions of the device until the party affirmatively makes the functions available to the consumer.

Referring again to FIG. 1, at step 620, a message is provided to the consumer indicating that the utility associated with the received device will be activated if the consumer contacts a creditor. In some embodiments, the indication is made using the device that is provided at step 610. For example, where the device of step 610 is a card-based device, such as a phone card, a sticker with a message indicating that the account associated with the card will be activated when the consumer calls the creditor may be affixed on the calling card. In other embodiments, the message may appear on a display screen of the device that is provided to the consumer at step 610. For example, the message may appear on the display screen of a mobile phone when the consumer turns on the mobile phone. However, in other embodiments, the indication may be provided to the consumer separately from the device. For example, the indication may be provided on a letter that is enclosed with a gift card. Indicating to the consumer that the utility will be activated if the consumer contacts a party, such as a creditor, is advantageous in certain embodiments because such an indication motivates the consumer to contact the party. Further, providing a device having a utility that can be activated is a more appealing incentive for a consumer than a mere promise of an incentive because the physical possession of the device increases the realism of the incentive. Providing devices that are associated with communications is also advantageous in some embodiments because the device facilitates the consumer's contact with the third party. For example, where a mobile phone is provided as the device of step 610, the mobile phone may be used to contact the creditor. Method 600 stops at step 628.

FIG. 2 is a flowchart illustrating one embodiment of a method 700 for debt recovery. Method 700 starts at step 710. At step 720, contact information of a consumer is obtained. In some embodiments, the consumer of step 720 owes a debt, such as a financial debt, to a creditor. Contact information of step 720 may be any type of information that allows a third party to send information and/or a device to a consumer. At step 724, a contact incentive package is provided to the consumer. A contact incentive package comprises a device having a utility that becomes available to the consumer after being activated. As with other embodiments, and depending upon the desired parameters, the device may be activated by the consumer, an entity with whom the consumer has a financial agreement (such as a creditor), or by a third party. Preferably, the contact incentive package also comprises a message indicating that the utility of the device can be activated if the consumer contacts the creditor. In some embodiments, the contact incentive package also comprises an activation protocol, which includes information and instructions for contacting an entity, such as a creditor. For example, the activation protocol may provide a telephone number and may instruct the consumer to contact, via telephone, a creditor to whom the consumer owes a debt. In certain embodiments, the activation protocol may also include an amount of time within which the consumer is required to contact the creditor to be able to access the one or more functions of the device, or a deadline by which the consumer is required to contact the creditor in order to benefit from the utilities of the received device. In some embodiments, step 724 may be performed using method 600 shown in FIG. 1.

At decision step 728, a determination is made as to whether the consumer has initiated a contact with a creditor. If no, then the "no" branch is followed to step 730 where method 700 stops. If yes, then the "yes" branch is followed to step 734 where the creditor provides to the consumer a plan for the repayment of the debt. Although debt repayment plan is used as one example of information provided by the creditor during the communication session initiated by the consumer, in some embodiments, such as embodiments where the device of step 724 is associated with communications services, any information or offer that the creditor desires to communicate to a consumer may be provided at step 734.

At decision step 738, a determination is made as to whether the provided plan has been accepted by the consumer. If no, then the "no" branch is followed to step 740 where the creditor initiates an activation of at least one utility or function of the device provided at step 724. At step 744, in some embodiments, the utility associated with the device provided at step 724 may expire, and the creditor may recover the balance of the utility that has not been used by the consumer. For example, in an embodiment where the device provided to the consumer at step 724 is a card-based device that is associated with an account that tracks available calling minutes, monetary value, or other units of value, the value may expire by a predetermined time. In some embodiments, steps 740 and 744 may be omitted.

Referring back to decision step 738, if the plan is accepted, then the "yes" branch is followed to step 750 where the activation of the utility of the device provided at step 724 is initiated. The initiation of the activation may be performed by an entity, such as a creditor, during or after the communication session initiated by the consumer. Referring to steps 738, 740, and 750, in some embodiments, the functions of the device may be activated regardless of whether the plan is accepted at step 738. Such an offer to activate the device may be indicated by a message in the contact incentive package of step 724, which is advantageous in some embodiments because such a statement enhances the incentive for a consumer to at least contact the creditor. At step 754, in some embodiments, the debt repayment plan that has been described at step 734 is executed. Such an execution of a debt repayment plan may include the receipt of payments made by the consumer, and may also include providing additional one or more incentives to the consumer for reducing at least a portion of the debt. For example, in certain embodiments where a SVC is the device provided at step 724, additional value may be credited to the account associated with the SVC when the consumer follows at least a portion of the plan described at step 734. In some embodiments, more than one type of device may be used to provide the incentives for the consumer to repay the debt. For example, the device that is initially provided to the consumer may be a mobile phone, and additional incentives that are provided during the execution of the debt payment plan may include a gift card, a calling card, and/or a SVC. Method 700 stops at step 730.

Figure 3:
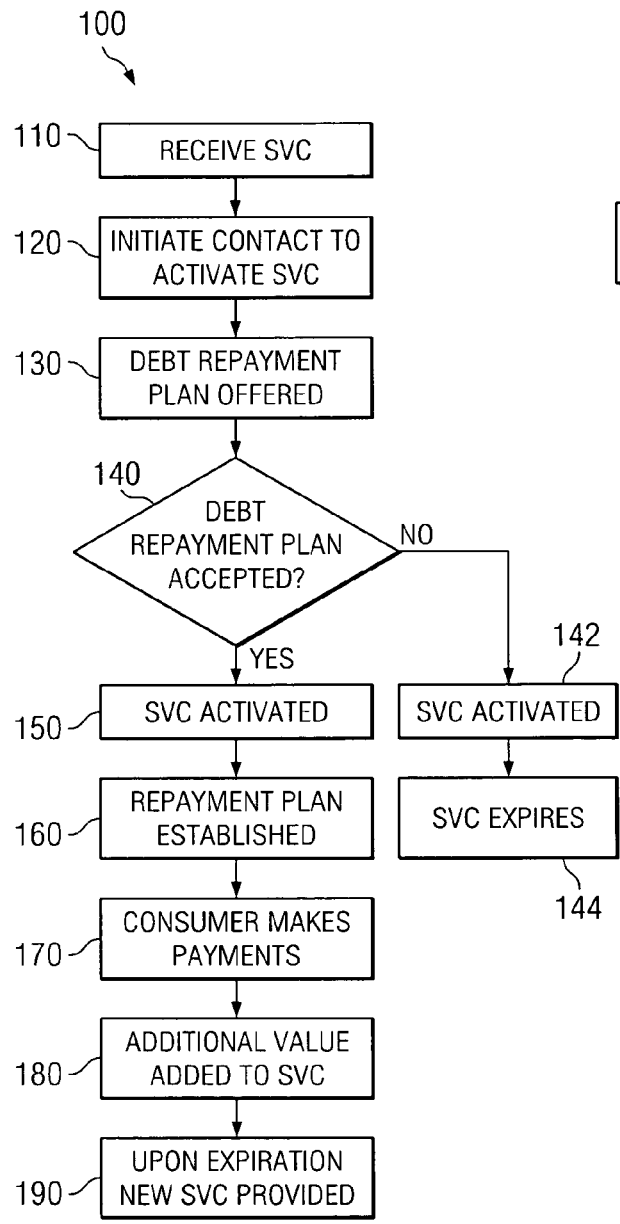
FIG. 3 illustrates a method for recovering debt from a consumer in accordance with an embodiment of the present invention.

FIG. 3 illustrates a method for debt recovery 100 wherein at step 110 a consumer having at least some debt receives a SVC from a service provider. The SVC may be a credit card, debit card, gift card or any other type of identification card capable of affecting transactions between a consumer and a service provider. For example, the SVC may be any card having a magnetic stripe, embossed information, printed information, and/or any other type of data that allows a consumer to consummate transactions with a service provider.

Upon receipt, the SVC is preferably inactive. Additionally, the SVC may include an activation protocol, such as a sticker affixed to the SVC or an instruction printed in the mailing accompanying the SVC. Preferably, the activation protocol will include a number the consumer may call to activate the card to access any funds that may be pre-loaded on the SVC. The activation protocol may also include activation instructions that allow the consumer to activate the card by contacting the service provider via a postal service, the Internet, or World Wide Web. Making World Wide Web and/or Internet access a part of the activation protocol may allow the service provider to offer debt repayment plans to vary according to consumer, and may also allow a consumer to choose between various plans that may provide for a greater percentage of the consumer's payment to be refunded to the card based on the consumer repaying the charged-off debt in larger installments.

At step 120, a consumer follows the activation protocol, thus establishing contact with the service provider. Once contact has been established between the service provider and the consumer, at step 130 the service provider provides a debt repayment plan to the consumer. While the debt repayment plan is preferably a dollar repaid for each dollar owed, or a "dollar-for-dollar" debt repayment plan, the service provider may elect to forgive some portion of the consumer's charged-off debt. Alternatively, the service provider may provide various other incentives to encourage the consumer to accept the debt repayment plan and repay the charged-off debt. Additionally, the debt repayment plan according to one embodiment may include the service provider repaying a portion of the debt paid by the consumer back to the consumer as a reward for repaying the debt.

At step 140 the consumer either accepts or rejects the debt repayment plan. If the consumer rejects the debt repayment plan, the service provider may nonetheless activate the SVC to allow the consumer access to the funds that may be pre-loaded on the SVC at step 142. At step 144, the SVC expires. Upon expiration of the SVC, any funds not used by the consumer will be returned to the service provider. If, at step 140, the consumer accepts the debt repayment plan, the stored-value card is activated at step 150. At step 160, the service provider establishes the debt repayment plan, which includes at least the consumer making payments to repay the debt.

At step 170, the consumer makes payments in order to repay the debt. These payments may be made at certain intervals, preferably monthly, but may be at any interval not to exceed a maximum interval established by the service provider. At step 180, and as part of the debt repayment plan offered to the consumer at step 130, additional value may be added to the SVC upon the consumer making payments according to the debt repayment plan.

At step 190, the SVC may be replaced upon expiration by the service provider. Step 190 may be advantageous in order to prevent fraud associated with the SVC offered to the consumer. For example, if the SVC is not activated by the consumer, the funds that may be preloaded on the SVC will be returned to the service provider upon expiration of the card. A short expiration period, for example 30 days or 60 days, may allow a service provider to quickly recover funds preloaded onto the card. Additionally, the SVC may be provided to a consumer without knowledge of whether the consumer is located at the address to which the SVC is mailed. Additionally, the consumer may elect to activate the card without accepting a debt repayment plan. Thus, a short expiration period for the SVC allows the consumer the opportunity to use the funds preloaded on the card if the card is activated, but sets a time limit within which the consumer must use the funds, or the funds will be returned to the service provider. In one embodiment of debt recovery plan 100, the service provider may establish an inactive account corresponding to the SVC prior to mailing the SVC or otherwise making the SVC available to the consumer. Establishing a preexisting inactive account corresponding to the SVC and the consumer to which the SVC is provided may expedite the establishment of the debt repayment plan.

Figure 4:
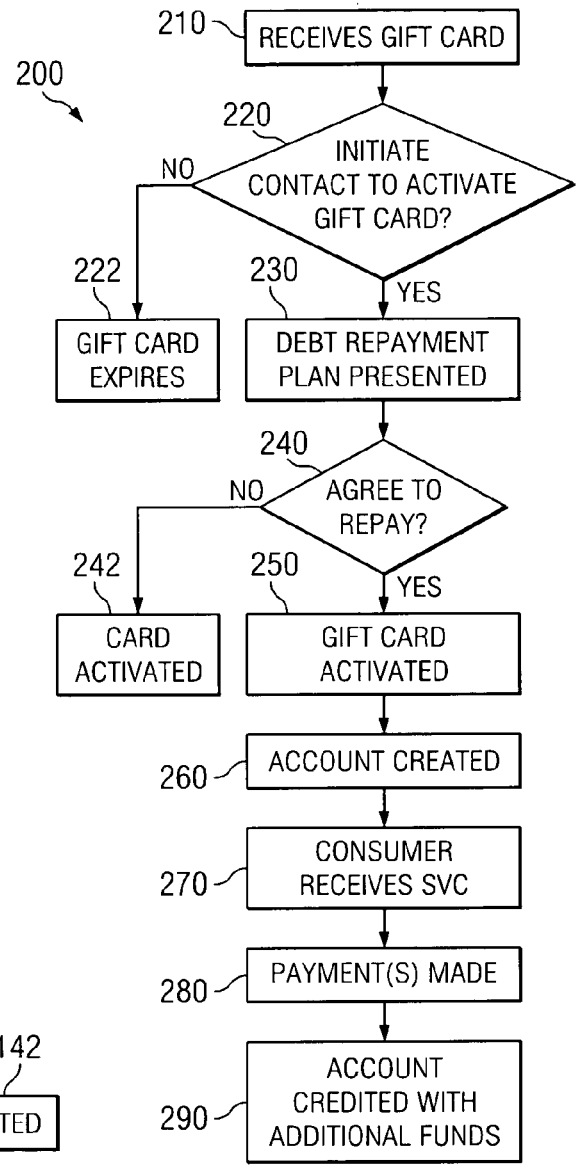
FIG. 4 illustrates a method for recovering debt from a consumer in accordance with an embodiment of the present invention.

FIG. 4 illustrates a debt repayment plan 200 wherein at step 210 a consumer receives a gift card. The gift card may be a preloaded debit card, a gift card provided by a retail provider in association with the service provider, or a credit card with an associated positive balance. Additionally, the gift card may have an associated activation protocol which may include a telephone number or instructions for contacting the service provider via a postal service, or providing access to the service provider via an Internet address or other access via the World Wide Web. The activation protocol associated with the gift card preferably provides a way for a consumer that receives the gift card to contact the service provider to activate the card. At step 220, the consumer follows the activation protocol to establish contact with the service provider in order to activate the gift card. If the consumer does not contact the service provider according to the associated activation protocol, the gift card expires at step 222. If, at step 220, the consumer initiates contact using the activation protocol, the service provider provides a debt repayment plan to the consumer at step 230.

The debt repayment plan provided to the consumer at step 230 may provide for the service provider issuing subsequent gift cards to the consumer upon the consumer's repayment of debt at predetermined increments. The debt repayment plan offered at step 230 may also allow for an account to be created associated with the consumer's debt repayment plan, thus allowing a consumer to receive a stored-value card or debit card from the service provider that has an initial balance as a reward for accepting the debt repayment plan offered by the service provider. If, at step 240, the consumer rejects the debt repayment plan offered at step 230, the gift card may be activated at step 242. Upon rejection of the debt repayment plan, the consumer may still be able to access the value stored on the gift card, but may not be entitled to subsequent gift cards or the receipt of a stored-value or debit card having an initial balance. If, at step 240, the consumer agrees to the debt repayment plan, the gift card is preferably activated at step 250. At step 260, the service provider creates an account for the consumer associated with the debt repayment plan.

At step 270, the service provider may issue a stored-value card or debit card to the consumer which is associated with the debt repayment plan account established at step 260. At step 280, the consumer preferably makes payments according to the debt repayment plan to the account associated with the debt repayment plan. At step 290, according to the debt repayment plan, the service provider may credit the account associated with the debt repayment plan and stored-value card with additional funds as a reward for the consumer repaying the debt according to the debt repayment plan. In yet another embodiment, the consumer may elect not to receive a stored-value card. In this embodiment, a consumer may elect to receive additional gift cards operable to purchase goods and/or services from retail stores or participating stores.

It should be understood that the embodiments illustrated in FIGS. 1-4 are methods containing steps that may be performed in a particular order. However, the order presented in the disclosed embodiments should not limit the actual order in which the steps are performed in the scope of the present invention as defined by the claims. For example, in FIG. 3, activation of the card at step 150 may occur prior to offering the debt repayment plan at step 130. Similarly, in FIG. 4, the account created at step 260 may occur prior to step 210 when the consumer receives the card. In this embodiment, the account would remain inactive until the consumer requests activation of the card. Moreover, various steps may be eliminated from certain embodiments and various steps of certain embodiments may be combined with steps from certain other embodiments. These and other changes will be readily apparent to one of ordinary skill in the art.

Figure 5:
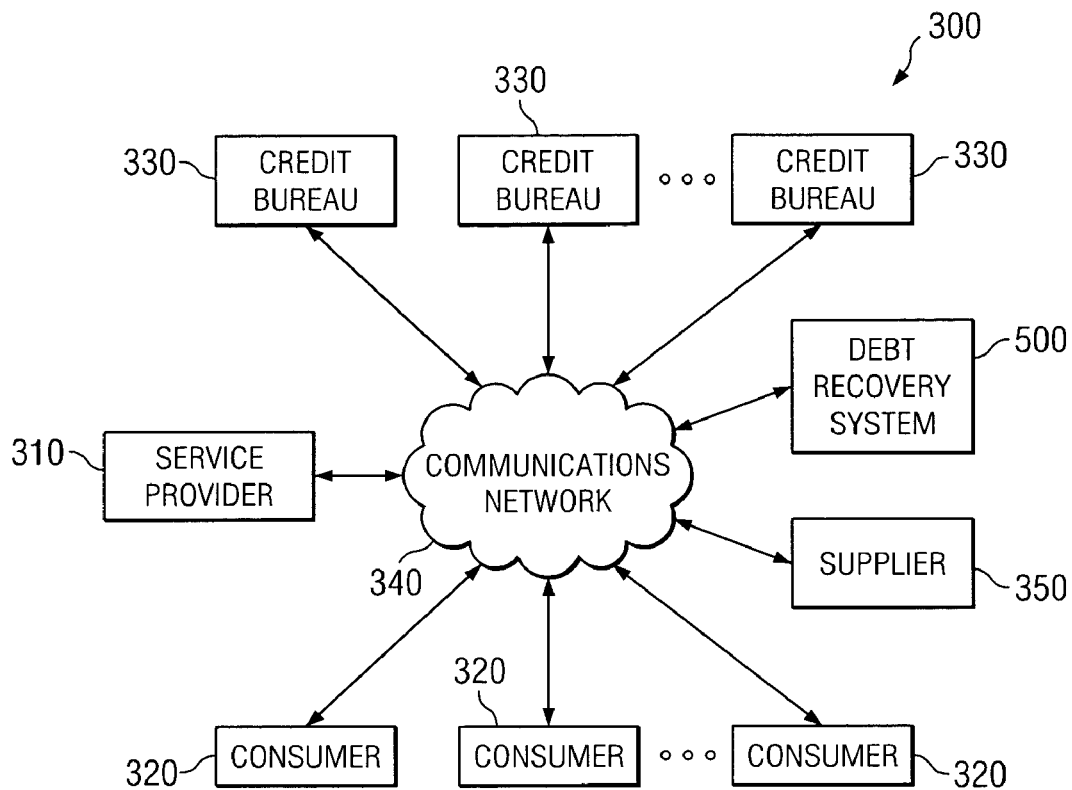
FIG. 5 illustrates an example system for handling credit accounts in accordance with an embodiment of the present invention.

FIG. 5 illustrates an example system 300 for handling credit accounts. System 300 may include a service provider 310, one or more consumers 320, and one or more credit bureaus 330, which may be coupled to each other by a communications network 340. Additionally, debt recovery system 500 and supplier 350 may be coupled to the service provider 310 by communications network 340. As described in greater detail below, debt recovery system 500 may provide any or all of the debt recovery functions described herein. Service provider 310 and consumers 320 may communicate with each other regarding credit accounts using communications network 340. For example, a consumer 320 may contact service provider 310 using communications network 340 to open a credit account, make inquiries or requests regarding a credit account, make payments to service provider 310, or close a credit account. Service provider 310 may similarly contact consumer 320 to offer credit to consumer 320, make inquiries regarding recent charges posted to a credit account, or remind consumer 320 of payments due. Although service provider 310 and consumers 320 are described as communicating with each other using communications network 340, the present invention contemplates any suitable form of communication between service provider 310 and consumers 320. For example, a consumer 320 may contact service provider 310 by telephone to make inquiries or requests regarding a credit account or by mail to make a payment to service provider 310. Similarly, service provider 310 may contact a consumer 320 by mail to offer credit to consumer 320. Service provider 310 may communicate with credit bureau 330 using communications network 340 to obtain credit information regarding consumers 320, as described more fully below.

A consumer 320 may include an individual, a group of individuals, a business organization, or any other suitable entity to which service provider 310 may issue one or more credit cards, stored-value cards, and/or provide one or more lines of credit, or enter into any other similar type of financial agreement. A credit bureau 330 may provide credit information to service provider 310 regarding consumers 320. Credit information may include credit history information, payment information, personal information regarding occupation, income, home ownership, etc., and any other suitable information. As an example only and not by way of limitation, a credit bureau 330 may include TRANS UNION, EQUIFAX, EXPERIAN, or any other suitable credit bureau. Communications network 340 may, in particular embodiments, include one or more local area networks (LANs), metropolitan area networks (MANs), wide area networks (WANs), portions of the Internet, or any other appropriate wireline, optical, wireless, or other links.

Service provider 310 may include any suitable entity that issues credit card to consumers 320 and provides lines of credit (which may include revolving lines of credit) for purchases by consumers 320. As an example only and not by way of limitation, service provider 310 may in particular embodiments include a merchant or other bank or a credit union. Although purchases are described, the present invention contemplates any suitable transactions in which payments may be made using credit. For example, a consumer 320 may use credit to rent one or more items. Service provider 310 may issue any suitable form of credit. As an example and not by way of limitation, service provider 310 may issue one or more MASTERCARD, VISA, DISCOVER, DINERS CLUB, JCB or other suitable credit cards. Additionally, service provider 310 may issue a revolving credit line accessible by check or other negotiable instrument. Credit accounts issued by service provider 310 may include general purpose credit cards (which may be used to purchase a number of different items associated with a number of different industries from a number of different merchants), private label cards (which may be used to purchase only items associated with a particular industry or items from only one or more particular merchants), or both. Although cards are particularly described, the present invention contemplates, in addition to credit card accounts having associated cards issued to consumers 320, credit accounts that do not have associated cards. For example, service provider 310 may open a credit account for a consumer 320 having an associated credit account number but no associated card. Consumer 320 may then purchase items on credit using the associated credit account number or negotiable instruments issued for use with the associated account. Reference to "credit cards" or "credit card accounts" may, where appropriate, encompass such credit accounts.

Service provider 310 may handle credit card accounts, which may include opening credit card accounts for consumers 320, monitoring credit card accounts, billing consumers 320, receiving and handling inquiries and requests from consumers 320 regarding credit card accounts, and closing credit card accounts. In particular embodiments, as described more fully below, opening a credit account for a consumer 320 may include establishing a line of credit according to credit information from credit bureau 330 regarding consumer 320, information obtained from consumer 320 directly, one or more evaluations of payments received from consumer 320, or other suitable information, establishing one or more terms of a credit account agreement between service provider 310 and consumer 320, and activating one or more services which service provider 310 may provide to consumer 320 in connection with the credit account.

Figure 6:
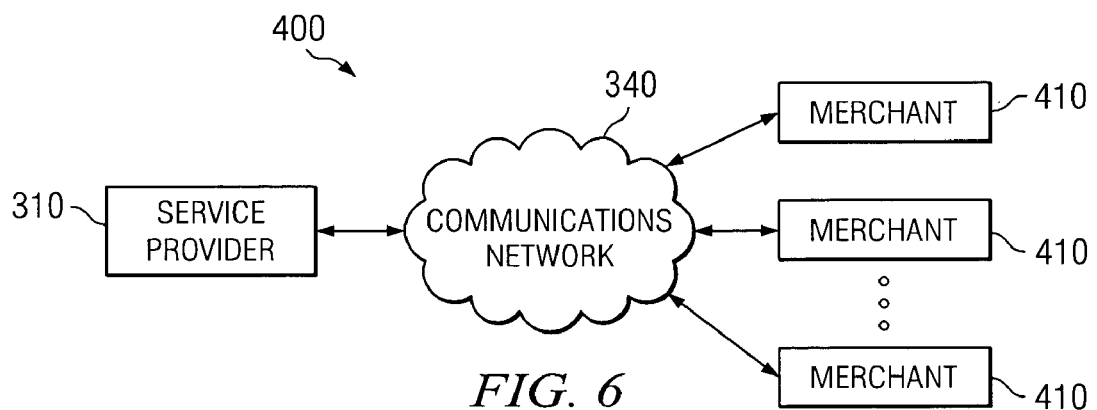
FIG. 6 illustrates an example system for handling transactions in which payments are made using cards issued according to an embodiment of the present invention.

FIG. 6 illustrates an example system 400 for handling transactions in which payments are made using credit accounts. System 400 may include service provider 310 and one or more merchants 410, which may be coupled to each other by communications network 340. Preferably at least one service provider 310 and/or merchant 410 is linked to a debt recovery system (not expressly shown), which may be a debt recovery system 500 as described in greater detail below. A merchant 410 may include any suitable entity that sells items to cardholders and may include a single entity (such as, for example, an individual store) or a number of entities (such as, for example, a chain of stores). A merchant 410 may include a seller or distributor that sells items produced by one or more otherwise unaffiliated producers. In addition or as an alternative, merchant 410 may include a producer that sells one or more items it produces directly to cardholders, bypassing distributors. Merchant 410 may include one or more outlets at one or more physical locations and may, in addition or as an alternative, include one or more call centers where phone orders are received from cardholders, one or more Websites or other virtual locations where electronic orders are received from cardholders, and one or more warehouses (which may be owned by merchant 410 or owned by one or more entities separate from merchant 410 for which merchant 410 sells items to cardholders) where orders received from cardholders are filled. Payment may be made for items provided by merchant 410 using a general purpose card, private label card, or any other suitable credit account. Although merchants 410 are described as selling items to consumers, such as consumers 320 of FIG. 5, the present invention, as described above, contemplates any suitable transactions between merchants 410 and consumers. As an example, a merchant 410 may rent one or more items to a consumer. As another example, a merchant 410 may provide one or more services to a consumer.

Communications network 340 supporting communication between service provider 310 and merchant 410 may include, as described above, one or more local area networks (LANs), metropolitan area networks (MANs), wide area networks (WANs), portions of the Internet, or any other appropriate wireline, optical, wireless, or other links. Communications network 340 may, where appropriate, include one or more private networks used exclusively for communication between service provider 310 and one or more particular merchants 410. This may be the case where, for example, service provider 310 provides lines of credit to consumers to purchase items only at one or more particular merchants 410. Although service provider 310 and merchants 410 are described as separate entities, in particular embodiments, service provider 310 and one or more merchants 410 may be part of a single, larger organization. In particular embodiments, service provider 310 may include one or more merchants 410. In particular embodiments one or more merchants 410 may include service provider 310.

A consumer may purchase items from a merchant 410 in any suitable manner. As an example, the consumer may purchase items from merchant 410 at a store or other physical location operated by merchant 410. As another example, a consumer may purchase items from merchant 410 over the telephone, by mail, or using the Internet or other suitable communications network (which may be similar to communications network 340), and the purchased items may be subsequently shipped to the consumer. When a consumer purchases one or more items from a merchant 410, merchant 410 may generate an electronic record of the transaction and communicate the generated record to service provider 310. A transaction record may be generated in any suitable manner, such as at a point-of-sale terminal or other device, and may include any suitable transaction data. For example, a transaction record may include data reflecting a credit account number (or, as described above, a credit account number), data reflecting a transaction price, data identifying merchant 410, and data reflecting a transaction date. Service provider 310 may use the communicated transaction record to update the credit account of the consumer for billing and possibly other purposes.

FIG. 7 illustrates an example debt recovery system 500. Debt recovery system 500 may include components of service provider 310 having one or more operator terminals 510, a data management system 520, one or more function modules 530, and a database 540. Service provider 310 may also have other components not illustrated in FIG. 7. The various components may be located at a single site or, alternatively, at a number of different sites. The components of service provider 310 may be coupled to each other using one or more links, each of which may include one or more computer buses, local area networks (LANs), metropolitan area networks (MANs), wide area networks (WANs), portions of the Internet, or any other appropriate wireline, optical, wireless, or other links. An operator terminal 510 may provide an operator access to data management system 520 to configure, manage, or otherwise interact with data management system 520. An operator terminal 510 may include a computer system (which may include one or more suitable input devices, output devices, processors and associated memory, mass storage media, communication interfaces, and other suitable components) or other suitable device.

Data management system 520 may manage data associated with credit accounts, which may in particular embodiments include creating, modifying, and deleting data files associated with credit accounts automatically or in response to data received from one or more operator terminals 510, function modules 530, or consumers 320. Additionally, data management system 520 may call one or more function modules 530 to provide particular functionality according to particular needs, as described more fully below. Data management system 520 may include a data processing unit 550, a memory unit 560, a network interface 570, and any other suitable components for managing data associated with credit accounts. The components of data management system 520 may be supported by one or more computer systems at one or more sites. One or more components of data management system 520 may be separate from other components of data management system 520, and one or more suitable components of data management system 520 may, where appropriate, be incorporated into one or more other suitable components of data management system 520.

Data processing unit 550 may process data associated with credit accounts, which may include executing coded instructions (which may in particular embodiments be associated with one or more function modules 530). Memory unit 560 may be coupled to data processing unit 550 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Network interface 570 may provide an interface between data management system 520 and communications network 340 such that data management system 520 may communicate with consumers 320, credit bureaus 330, merchants 410 and suppliers 350.

A function module 530 may provide particular functionality associated with handling credit accounts or handling transactions in which payments are made using credit accounts according to the debt recovery system 500. As an example only and not by way of limitation, a function module 530 may provide functionality associated with profile management, risk profiling, service interest, service enrollment, credit account management, billing, or incentive management. A function module 530 may be called by data management system 520 (possibly as a result of data received from an operator terminal 510, a consumer 320, or a supplier 350 via communications network 340) and, in response, provide the particular functionality associated with function module 530. A function module 530 may then communicate one or more results to data processing unit 550 or one or more other suitable components of data management system 520, which may use the communicated results to create, modify, or delete one or more data files associated with one or more credit accounts, provide data to an operator at operator terminal 510 or consumer 320, or perform any other suitable task. Function modules 530 may be physically distributed such that each function module 530, or multiple instances of each function module 530, may be located in a different physical location geographically remote from each other and/or from data management system 520.

In the embodiment shown in FIG. 7, function modules 530 include a profile management module 532, an account management module 534, and an incentive management module 536. According one embodiment of debt recovery system 500, a supplier may establish communication with data management system 520 via communications network 340 to provide a list of available credit accounts accessible by the supplier 350. Such accounts may be charged-off accounts, active revolving credit lines, active credit cards, or accounts in collection status. Alternatively, data management system 520 may query a supplier 350 for available credit accounts. Upon receiving account information, data management system 520 preferably calls on profile management module 532 to evaluate the accounts in any number of desired criteria to determine the feasibility of attempting to implement a debt recovery plan for each account. The completed evaluation may assign a risk value to the account to be processed by data processing unit 550 of data management system 520 and stored in database 540 for future use by other modules or other systems within service provider 310. Additionally, database 540 may contain account information on accounts owned or controlled by service provider 310, thus eliminating the need for a supplier 350 in an embodiment. In such an embodiment, profile management module 532 may evaluate existing service provider accounts from database 540 to determine the feasibility for debt recovery plan implementation for the selected accounts.

Incentive management module 536 may access the account profiles stored in database 540 to determine an incentive program appropriate for an account and to generate a file containing an incentive program for the account for storage by the data management unit 520. A file generated by incentive management module 536 may be operable to establish the amount of value that should be made available through a particular incentive device to be provided to a consumer. For example, the file may be operable to establish the number of calling minutes for a calling card to be distributed to the account holder. In another example, the file may be operable to establish the amount of value for any SVC or gift card to be distributed to the account holder. In some embodiments, the file may be operable to select one or more of a plurality of functions that are associated with a device, and establish an amount of value to be associated with each selected function. For example, the file may select the calling function and a game function of a mobile phone, and establish 60 calling minutes for the calling function and 120 minutes of gaming for the game function. The file may be stored separately in database 540 or appended to an existing account file in database 540.

Data management unit 520 may access files generated by profile management module 532 to determine whether to make an incentive device, such as a SVC or gift card, available to a consumer 320. If service provider 310 makes an incentive device available to a consumer 320, consumer 320 may contact service provider 310 by communications network 340. Consumer 320 may contact service provider 310 via telephone, Internet, or any other suitable way to contact service provider 310. Upon establishing contact with a consumer 320, service provider 310 may, through terminals 510 or other suitable means, access files stored in database 540 that contain profile and incentive information for the consumer 320 generated by the profile management module 532 and the incentive management module 536, respectively. These files preferably allow service provider 310 to offer a debt recovery plan suitable to the account.

The service provider may offer any number of incentives associated with the incentive device provided to consumer 320. These incentives may include issuing subsequent incentive devices, such as gift cards, upon receiving payments credited to the account. In certain embodiments where the incentive device is card-based and associated with a predetermined amount of value, these incentives may include disbursing additional value to the account of the card-based device upon receiving payment by consumer 320. Other incentives may include issuing a consumer 320 a debit card associated with the account that allows incentive funds to be allocated to the debit card, or in the alternative, for the service provider 310 to deduct funds for payment according to the debt repayment plan. Other incentives may be readily ascertained by one of ordinary skill in the art. Upon establishing a debt recovery plan with the consumer 320, account management module 530 preferably establishes a debt recovery account, activates any utility of the device (an SVC or a gift card, for example) provided to consumer 320, and manages the account information. Managing account information may include recording the debt recovery plan and any associated incentives in a file associated with consumer 320, billing, crediting the account for payments received by consumer 320, and disbursing incentives to the account associated with consumer 320.

Although some embodiments of the present invention has been described in detail, it should be understood that various changes, substitutions, and alterations may be made, without departing from the spirit and scope of the present invention as defined by the claims.

What is claimed is:

1. A computer-implemented method for recovering debt from a consumer, comprising:
    making a stored-value card available to a consumer, the stored-value card having an associated account and activation protocol and an initial balance, wherein the initial balance in the stored-value card account is determined, using a processor, by the amount of the consumer's debt with a creditor;
    providing a debt repayment plan to the consumer in response to the contact and activation request from the consumer
    electronically activating, by a processor, the stored-value card in response to the consumer's acceptance of the debt repayment plan;
    receiving a payment from the consumer according to the debt repayment plan, the payment comprising at least a portion of the debt; and
    electronically transferring, by a processor, a monetary balance to the stored-value card account associated with the stored-value card upon receipt of the payment.

2. The method of claim 1, wherein the store-value card has an initial balance when made available to the consumer.

3. The method of claim 1, wherein the stored-value card has an initial balance when the consumer agrees to the debt repayment plan.

4. The method of claim 1, wherein the stored-value card has an initial balance when the consumer makes a payment according to the debt repayment plan.

5. The method of claim 1, wherein the stored-value card is a debit card, the debit card operable to deduct an amount of purchase from funds existing in the account.

6. The method of claim 5, wherein an amount may be deducted from the debit card to repay debt according to the debt repayment plan.

7. The method of claim 1, wherein the activation protocol comprises information provided with the stored-value card, the activation protocol containing a phone number the consumer must call to activate the account.

8. The method of claim 1, the stored-value card operable to expire within a predetermined time.

9. The method of claim 1, wherein the amount of money that is transferred to the account when the consumer repays at least a portion of the outstanding debt comprises a percentage of the at least a portion of the outstanding debt repaid by the consumer.

10. The method of claim 1, wherein the stored-value card is operable to enable the consumer to make purchases from a plurality of vendors.

11. The method of claim 1, wherein the initial balance is transferred to the stored-value card by transferring money to an account associated with the stored-value card after the consumer agrees to the debt repayment plan.

12. The method of claim 1, wherein the initial balance is transferred to the stored-value card account after the consumer makes at least one payment under the debt repayment plan.

13. The method of claim 1, wherein the stored-value card is operable to withdraw funds from automated teller machines.

14. The method of claim 1, wherein the stored-value card is a prepaid phone card.

15. The method of claim 1, wherein the stored-value card is a gift card issued by a merchant.

16. A computer-implemented method for offering a debt repayment plan to a consumer, comprising:
   making a gift card with an initial balance available to a consumer, the gift card having an associated protocol, wherein the initial balance in the gift card is determined, using a processor, by the amount of the consumer's debt with a creditor;
   providing a debt repayment plan to the consumer in response to a contact and activation request from the consumer; and
   electronically activating, using a processor, the gift card in response to the contact and activation request from the consumer;
   receiving a payment from the consumer according to the debt repayment plan, the payment comprising at least a portion of the debt; and
   making at least one additional gift card available to the consumer upon receipt of the payment.

17. The method of claim 16, wherein the gift card operable to make purchases at a vendor that accepts credit cards for payment.

18. The method of claim 16, further comprising the consumer agreeing to the debt repayment plan.

19. The method of claim 18, further comprising:
   establishing a consumer account corresponding to the debt repayment plan;
   the consumer making at least one payment according to the debt repayment plan; and
   making a stored-value card available to the consumer, the stored-value card corresponding to the consumer account.

20. The method of claim 19, wherein the stored-value card has an initial balance.

21. The method of claim 20, wherein the initial balance is determined by the amount of the at least one payment.

22. The method of claim 19, wherein the stored-value card is affiliated with a major credit card company.

23. The method of claim 19, wherein the stored-value card is a debit card operable to deduct funds from the consumer account when the consumer makes a purchase.

24. The method of claim 19, wherein the stored-value card is a debit card operable to deduct funds from the consumer account when the consumer withdraws funds from an automatic teller machine.

25. The method of claim 20, wherein funds may be deducted from the debit card to repay any debt carried in the account.

26. The method of claim 18, wherein at least one additional gift card is made available to the consumer when the consumer makes at least one payment according to the debt repayment plan.

27. The method of claim 26, wherein the at least one additional gift card has a stored-value equal to a percentage of the amount of the at least one payment.

28. The method of claim 16, wherein the activation protocol is comprised of a sticker removably affixed to the gift card.

29. The method of claim 16, wherein the initial balance on the gift card is determined by the amount of the outstanding debt.

30. The method of claim 16, wherein the gift card is a prepaid phone card.

31. A computer-implemented method of offering a debt recovery plan, comprising:
   providing a card, with an initial balance, to a consumer owing a financial debt to a creditor, the card associated with an account established to give the consumer access to communications services after the creditor initiates an activation of the account, wherein the initial balance in the card is determined, using a processor, by the amount of the consumer's debt with the creditor;
   indicating to the consumer that activation of the account will be initiated if the consumer contacts the creditor;
   participating in a communications session initiated by the consumer over a network, wherein a debt repayment plan is provided to the consumer during the communications session; and
   electronically activating, using a processor, the account in response to the consumer's participation in the communications session.

32. The method of claim 31, wherein the account is to be expired at a predetermined time period.

33. The method of claim 31, wherein the account associated with the card is established to be used for communication with only the creditor prior to the activation of the account.

34. The method of claim 31, wherein indicating to the consumer that activation of the account will be initiated if the consumer contacts the creditor comprises indicating to the consumer that activation of the account will be initiated if the consumer contacts the creditor within a predetermined time period.

35. The method of claim 31, wherein the card is a stored-value card.

36. The method of claim 31, wherein the card is a gift card.

37. The method of claim 31, wherein the card is a prepaid phone card.

* * * * *